US009397888B2

(12) United States Patent
Nylander et al.

(10) Patent No.: US 9,397,888 B2
(45) Date of Patent: *Jul. 19, 2016

(54) METHOD AND A SERVER FOR ASSISTING A CENTRALIZED INITIALIZATION OF A RADIO ACCESS NODE

(75) Inventors: Tomas Nylander, Värmdö (SE); Per-Daniel Stålnacke, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,193

(22) PCT Filed: Apr. 12, 2012

(86) PCT No.: PCT/SE2012/050394
§ 371 (c)(1),
(2), (4) Date: Sep. 10, 2014

(87) PCT Pub. No.: WO2013/154477
PCT Pub. Date: Oct. 17, 2013

(65) Prior Publication Data
US 2015/0085700 A1    Mar. 26, 2015

(51) Int. Cl.
*H04L 12/28* (2006.01)
*H04L 12/24* (2006.01)
(Continued)

(52) U.S. Cl.
CPC ........ *H04L 41/0806* (2013.01); *H04L 41/0886* (2013.01); *H04L 41/24* (2013.01); *H04W 24/02* (2013.01); *H04W 84/042* (2013.01); *H04W 88/08* (2013.01)

(58) Field of Classification Search
CPC . H04L 41/0806; H04L 41/0886; H04L 41/24; H04W 24/02; H04W 88/08
See application file for complete search history.

(56) References Cited

U.S. PATENT DOCUMENTS 9,155,105 B2 * 10/2015 Hsu ...................... H04W 4/005
2003/0095520 A1 * 5/2003 Aalbers .................. H04L 29/06
370/338

(Continued)

FOREIGN PATENT DOCUMENTS

EP    1 947 811     7/2008
EP    2 110 990    10/2009
(Continued)

OTHER PUBLICATIONS

PCT Written Opinion of the International Searching Authority for International application No. PCT/SE2012/050394, Mar. 27, 2013.
(Continued)

*Primary Examiner* — Abdelnabi Musa
(74) *Attorney, Agent, or Firm* — Patent Portfolio Builders, PLLC (57) ABSTRACT

It is presented a user equipment (20), UE for assisting a centralized initialization of a radio access node (10). The UE (20) comprises a communication interface (22) arranged for wireless communication, a processor (23) and a memory (24) for storing a software package comprising computer program code. When the software package is run in the processor (23) it causes the user equipment (20) to collect configuration data useable for the centralized initialization of the radio access node (10). The UE (20) establishes a communication link with a centralized server (50) and communicates the collected configuration data to the centralized server (50) via the established communication link. Also a corresponding centralized server (50) for assisting the centralized initialization of the radio access node is presented. Furthermore corresponding methods, computer programs and computer program products are disclosed.

13 Claims, 4 Drawing Sheets

(51) Int. Cl.
*H04W 24/02* (2009.01)
*H04W 88/08* (2009.01)
*H04W 84/04* (2009.01)

(56) References Cited

U.S. PATENT DOCUMENTS

| | | | |
|---|---|---|---|
| 2007/0097939 A1* | 5/2007 | Nylander | H04L 29/12066 370/338 |
| 2009/0253421 A1 | 10/2009 | Camp, Jr. et al. | |
| 2009/0296641 A1* | 12/2009 | Bienas | H04W 24/02 370/329 |
| 2011/0150266 A1 | 6/2011 | Hohndel | |
| 2012/0178451 A1* | 7/2012 | Kubota | H04W 8/00 455/436 |

FOREIGN PATENT DOCUMENTS

| | | |
|---|---|---|
| WO | WO 02/07467 | 1/2002 |
| WO | WO 2008/033616 | 3/2008 |
| WO | WO 2010/028702 | 3/2010 |

OTHER PUBLICATIONS

International Search Report for International application No. PCT/SE2012/050394, Mar. 27, 2013.
QUALCOMM Europe "Framework for UE SON Reports," 3GPP TSG RAN WG3 & SA WG5, S5-090017, XP002588155, Jan. 12, 2008, pp. 1-5.

* cited by examiner

METHOD AND A SERVER FOR ASSISTING A CENTRALIZED INITIALIZATION OF A RADIO ACCESS NODE

PRIORITY

This nonprovisional application is a U.S. National Stage Filing under 35 U.S.C. §371 of International Patent Application Serial No. PCT/SE2012/050394, filed Apr. 12, 2012 and entitled "A Method and a Server for Assisting a Centralized Initialization of a Radio Access Node."

TECHNICAL FIELD

Embodiments of the present invention presented herein generally relate to initialization of radio access nodes. More particularly, embodiments disclosed herein relate to methods for assisting a centralized initialization of radio access nodes as well as corresponding user equipments, radio access nodes, computer programs and computer program products.

BACKGROUND

When starting up a new radio access node, such as a radio base station or an access point in a Wireless Local Area Network, WLAN, the radio access node is generally not pre-configured with any information. By not pre-configuring the radio access nodes the vendor is released from the administrative burden thereof and also the burden of keeping track of how each radio access node is configured. A non-configured radio access node is also much more useful and may be used anywhere in the radio access network, since it is not limited by its configuration. As a consequence the radio access nodes need to be configured at site before they can operate normally. Therefore, during initialization the radio access nodes generally need to connect to a management server in order to get access to configuration data necessary for subsequent enablement of normal operation of the radio access node. To access this information from the management server, the radio access node must initially be provided with some information about its management server, e.g. the identity of the management server and/or the (location) address of the management server.

The current solution to deal with this is to connect a laptop to the radio access node via a wired connection and manually enter the needed data to the radio access node via the user interface, normally the keypad of the laptop. This is typically done at the site where the radio access node is to be physically located. Since the installation process requires manual input by someone, this is sometimes considered a security risk. Furthermore, manual input by human beings may be error prone. Yet further, this process requires fairly skilled personnel. That is, the personnel may need to have a detailed technical skill, e.g., about the installation process.

Thus, if the configuration is done in factories by the vendors or in delivery centers by either the vendors and/or the operators, it will place an undue administrative and logistic burden on the vendors and/or operators. On the other hand, configuring the radio access notes on site will require skilled and costly personnel. At the same time there is an increase in installations of radio access nodes and especially low output nodes used in heterogeneous networks together with a desire in the industry to keep costs down and/or to increase availability of manpower with as low skill and/or short training as possible.

SUMMARY

In view of the above, an improved process for assisting a centralized initialization of radio access nodes would be advantageous and, in particular, a process allowing for a simplified deployment, cost-effectiveness, and/or enhanced security would be advantageous.

It is therefore a general object of embodiments of the present invention to mitigate, alleviate or eliminate one or more of the above-mentioned disadvantages and provide for improved initialization of radio access nodes.

According to a first aspect, a method is provided for assisting a centralized initialization of a radio access node. The method is performed in a user equipment. The user equipment may e.g. be a smart phone, a mobile phone or a cellular phone. The method comprises: installing a software package in the user equipment, which software package is executable in a processor of the user equipment; collecting configuration data useable for the centralized initialization of the radio access node by executing the software package in the processor of the user equipment; establishing a communication link with a centralized server; and communicating the collected configuration data to the centralized server via the established communication link. This means that the user equipment can collect configuration data and send it to a centralized server, which centralized server is accessible for the radio access node that is being initialized. Thus, the radio access node may be configured by almost anyone having the software package installed in the user equipment and of course is authorized to initialize the radio access node in question. There is no need that the personnel is technical skilled since the whole initialization process is automated, i.e. requires no or a very little manual input. The personnel only needs to power up the radio access node and execute the software package installed on the user equipment. All this provides for enhanced security during the initializing of the radio access node, i.e. less personnel induced errors will occur during the initialization process.

In a preferred embodiment, the step of collecting configuration data may comprise reading an optical representation of data associated with the radio access node, said optical representation of data is a unique identifier of the radio access node and may for example be realized by a barcode.

The step of collecting configuration data may comprise collecting a Public Land Mobile Network, PLMN, code as will be further detailed herein. In some embodiments, the method may also comprise collecting configuration data such as System Information, SI, data by scanning neighboring radio access nodes belonging to the PLMN.

In some embodiments, the step of collecting configuration data comprises collecting geographical location data by using the Global Positioning System, GPS.

According to a second aspect, a method is provided for assisting a centralized initialization of a radio access node. The method is performed in a centralized server when data useable for the centralized initialization has been collected by the user equipment according to the first aspect. The method comprises: receiving configuration data from the user equipment together with an unique identifier of the radio access node associated with the received configuration data; storing said configuration data and its associated unique identifier; receiving the unique identifier from the radio access node; retrieving configuration data associated with the unique identifier received from the radio access node; and sending said configuration data to the radio access node.

This means that configuration data is inputted to and used by the radio access node in an almost completely automated fashion, i.e. involving no or very little manual input from the personnel performing the initializing of the radio access node.

The configuration data may comprise a Public Land Mobile Network, PLMN, code. Additionally, or alternatively, the configuration data may comprise location data of the user equipment and/or SI data broadcasted by neighboring radio access nodes belong to the PLMN.

According to a third aspect, a computer program is provided. The computer program is suitable for assisting the centralized initialization of a radio access node. The computer program comprises computer program code which, when run in a processor of a user equipment, causes the user equipment to: collect configuration data useable for the centralized initialization of the radio access node; establish a communication link with a centralized server; and communicate the collected configuration data to the centralized server via the established communication link.

The computer program may additionally comprise computer program code which, when run in the processor of a user equipment, causes the user equipment to collect configuration data such as an optical representation of data associated with the radio access node, the PLMN, code, location data of the user equipment and/or SI data broadcasted by neighboring radio access nodes belong to the PLMN.

The computer program according to the third aspect allows for one or more of the earlier-mentioned advantages and/or effects.

According to a fourth aspect, a computer program product is provided. The computer program product comprises a computer program according to the third aspect and a computer readable means on which the computer program is stored.

According to a fifth aspect, a user equipment for assisting the centralized initialization of a radio access node is provided. The user equipment comprises a communication interface arranged for wireless communication; a processor; and a memory storing a software package comprising computer program code which, when run in the processor, causes the user equipment to: collect configuration data useable for the centralized initialization of the radio access node; establish a communication link with a centralized server; and communicate the collected configuration data to the centralized server via the established communication link.

The user equipment according to the fifth aspect provides for one or more of the earlier-mentioned advantages and/or effects.

The user equipment may comprise a reader, such as a barcode reader, arranged to read an optical representation of data associated with the radio access node, said optical representation of data being a unique identifier of the radio access node. The configuration data, other than the optical representation of data, that the user equipment may collect is the PLMN, code, location data of the user equipment and/or SI data broadcasted by neighboring radio access nodes belong to the PLMN.

The user equipment may e.g. be a smart phone, a mobile phone or a cellular phone. This means that the personnel performing the centralized initializing of the radio access node does not have to bring a comparatively larger laptop to the site where the radio access node is to be deployed.

According to a sixth aspect, a centralized server is provided for assisting a centralized initialization of a radio access node when configuration data useable for the centralized initialization has been collected by a user equipment according to the first aspect. The centralized server comprises a communication interface arranged for communication; a processor; and a memory storing computer program comprising computer program code. When the computer program code is run in the processor, this causes the centralized server to: receive configuration data from the user equipment together with a unique identifier of the radio access node associated with the received configuration data; store the configuration data in the memory together with its associated unique identifier; receive the unique identifier from the radio access node; retrieve from the memory the configuration data associated with the unique identifier which has been received from the radio access node; and send this configuration data to the radio access node.

The radio access node according to the sixth aspect provides for one or more of the earlier-mentioned advantages and/or effects.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of invention to those persons skilled in the art. Like numbers refer to like elements throughout the description.

Figure 1:
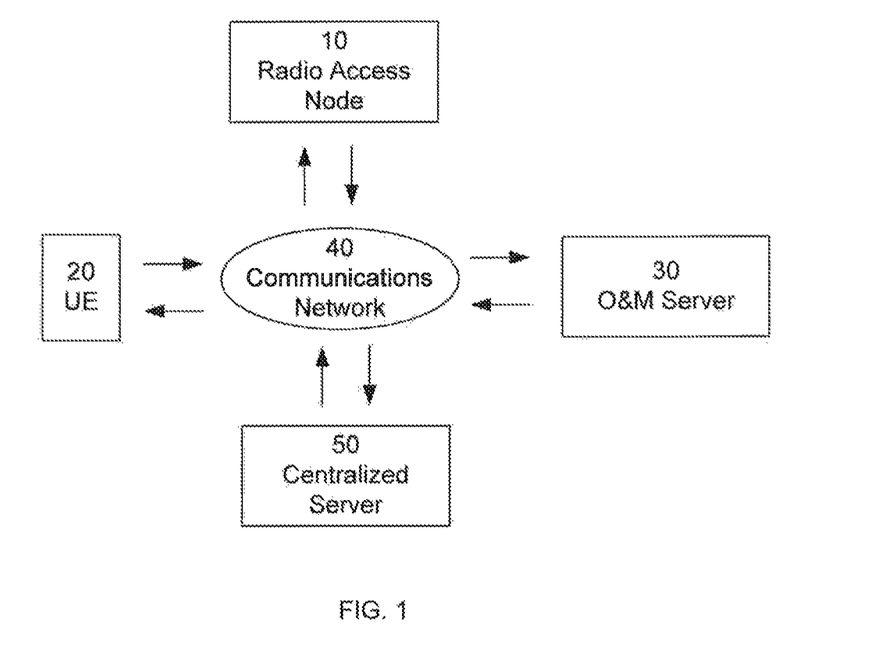
FIG. 1 is a schematic diagram illustrating an exemplary environment where embodiments presented herein can be applied.

FIG. 1 is a schematic diagram illustrating a possible environment where embodiments of the invention described herein can be applied. The diagram illustrates a radio access node 10, a user equipment 20, an Operation and Maintenance, O & M, server 30, a communications network 40 and a centralized server 50 all of which will be closer described below.

The radio access node 10 may be any node set up for communication via the communications network 140. Radio access nodes may be radio base stations, such as a Base Transceiver Station, BTS for the Global System for Mobile Communications, GSM, a NodeB (NB) for the Universal Mobile Telecommunications System, UMTS, an eNodeB (evolved NodeB, eNB) for Long Term Evolution, LTE, an access point in a Wireless Local Area Network, WLAN or any other radio access system. When the radio access nodes 10 are to be put into operation they need to be initialized and configured before they can operate normally, i.e. to serve traffic to and from user equipments 20 and/or other nodes. This configuration can e.g. include hundreds of parameters. During the initialization and configuration process of the radio access node 10, which will be described closer in conjunction with FIG. 5, the radio access node will be connected to the communications network 40 in order to obtain its correct configuration data. In context of the present application configuration data should be interpreted in a broad sense and is not only data needed to configure the radio access node 10 itself, but also data that is used in order for the radio access node 10 to connect to the correct management server, such as the O & M server or a Radio Network Controller, RNC.

Figure 2:
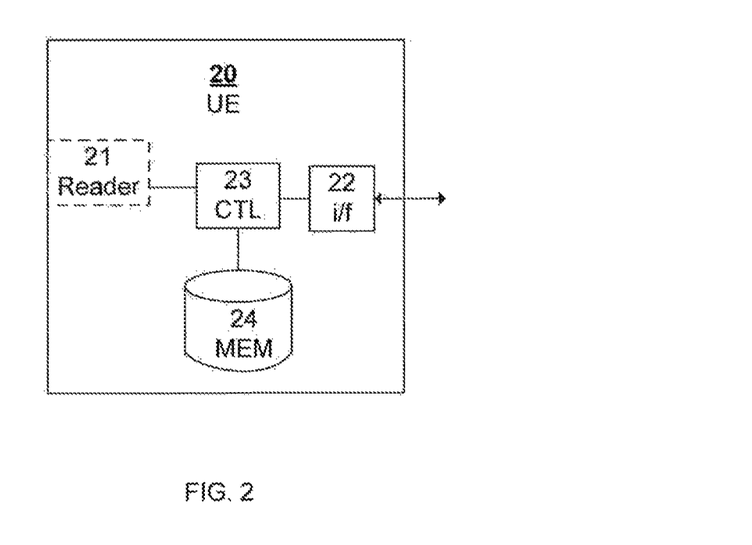
FIG. 2 is a schematic diagram illustrating some modules of an embodiment of a user equipment.

FIG. 2 is a schematic diagram illustrating some modules of an embodiment of a user equipment 20 (hereinafter referred to as UE). The UE 20 is also known as mobile communication terminal, user terminal or mobile terminal. In preferred embodiments, the UE 20 is a smart phone, mobile telephone or a cellular phone. However, it is equally possible that the UE 20 could be a laptop computer, tablet PC or the like. The UE 20 comprises a controller (CTL) or a processor 23 that may be constituted by any suitable Central Processing Unit, CPU, microcontroller, Digital Signal Processor, DSP, etc., capable of executing a computer program comprising computer program code. The computer program may be stored in a memory (MEM) 24. The memory 24 can be any combination of Read And write Memory, RAM, and Read Only Memory, ROM. The memory 24 may also comprise persistent storage, which, for example, can be any single one or combination of magnetic memory, optical memory, or solid state memory or even remotely mounted memory. The UE 20 may also comprise a reader 21, which is arranged to read an optical representation of data associated with the radio access node 10. The optical representation of data may be a unique identifier of the radio access node 10. The reader 21 may comprise a camera. In some embodiments, the reader 21 can be implemented as a barcode reader for reading a barcode. Alternatively, the reader 21 could be implemented as NeoReader. A NeoReader is a software application that is accessible for and downloadable to UEs 20 and that allows UEs to be used as a barcode scanner. The UE 20 further comprises a communication interface (i/f) 22 arranged for establishing a communication link with other devices or nodes, such as the centralized sever 50 via the communications network 40. When the above-mentioned computer program code is run in the processor 23 of the UE 20, it causes the UE 20 to collect configuration data useable for centralized initialization of the radio access node 10, establish a communication link with the centralized server 50 and communicate the collected configuration data to the centralized server 50 via the established communication link. If the reader 21 is implemented in the form of a NeoReader, the above-mentioned computer program may further comprise computer program code, which when run in the processor 23 of the UE 20, causes the UE 20 to read the optical representation of data associated with the radio access node 10.

The management or O&M server 30 is, as is well known to a person skilled in the art, used to provide radio access nodes 10 with additional input that is useable to enable normal operation of the radio access node. In prior art the radio access node was sometimes pre-configured with the address to the O&M server 30 such that the access node 10 during start up connects to the O&M server 30 to get configuration data. There are several drawbacks with this approached. Firstly the radio access node has to be pre-configured which increases the administrative burden of the vendor or operator as discussed above. Secondly, all configuration data must be pre-stored in the O & M server 30 which requires large administrative resources both for collecting the configuration data and to input it in the O & M server 30. In context of some embodiments of the present invention the O & M server 30 is used for configuration data that is common for all radio access nodes 10 such as program updates etc. Configuration data that is dependent on the location of the radio access node 10 will according to some embodiments of the present invention be collected by the UE 20. The communications network 40 depicted in FIG. 1 may be complying with any or a combination of UMTS, Code Division Multiple Access 2000, CDMA2000, LTE, GSM, WLAN etc, which all are well known techniques to a person skilled in the art and therefore not described any more.

Figure 3:
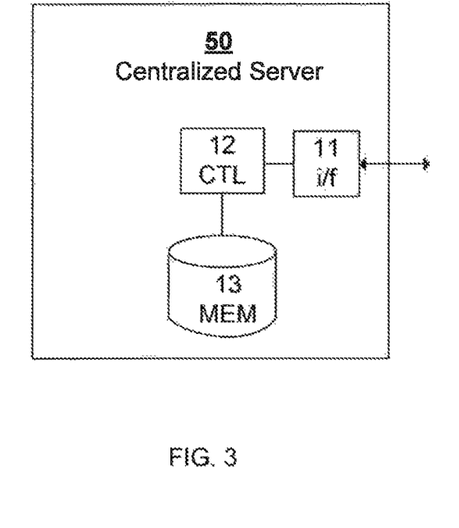
FIG. 3 is a schematic diagram illustrating some modules of an embodiment of a centralized server.

FIG. 3 is a schematic diagram illustrating some modules of an embodiment of the centralized server 50. This novel centralized server 50 is typically a vendor server, in which a unique identifier, such as a serial number, is stored for all the radio access nodes 10 associated with this particular vendor. There is typically only one centralized server 50 or a group of servers accessible through its address information such as one Internet Protocol, IP, address, one Uniform Resource Locator, URL, address or one Fully Qualified Domain Name, FQDN. The centralized server 50 may be any server or groups of servers that is/are configured to perform the method according to embodiments of the present invention. The centralized server 50 comprises a controller (CTL) or a processor 12 that may be constituted by any suitable CPU, microcontroller, DSP, etc., capable of executing a computer program comprising computer program code. The computer program may be stored in a memory (MEM) 13. The memory 13 can be any combination of a RAM and ROM. The memory 13 may also comprise persistent storage, which, for example, can be any single one or combination of magnetic memory, optical memory, or solid state memory or even remotely mounted memory. The centralized server 50 further comprises a communication interface (i/f) 11 for communication with other devices or nodes, such as the radio access node 10 via the communications network 40. When the above-mentioned computer program code is run in the processor 12 of the centralized server 50, it causes the centralized server 50 to receive configuration data from the UE 20 together with a unique identifier of the radio access node 10 associated with the received configuration data. The configuration data is stored in the memory 13 together with its associated unique identifier. The centralized server 50 furthermore receives the unique identifier from the radio access node 10, retrieves from the memory 13 the configuration data associated with the unique identifier which previously has been received from the radio access node 10 and then sends said configuration data to the radio access node 10.

Figure 4:
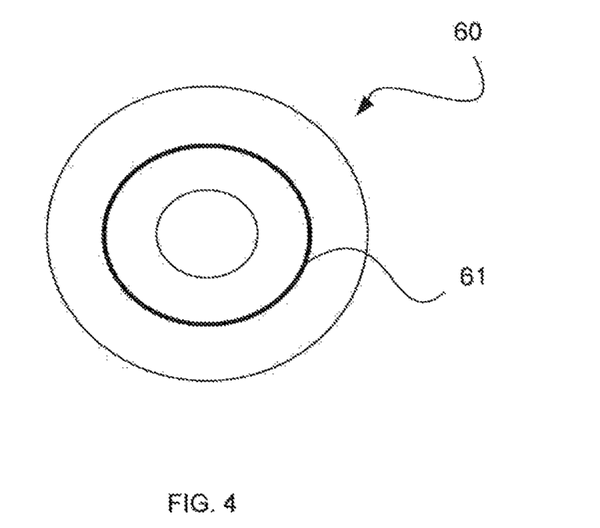
FIG. 4 schematically shows one example of a computer program product comprising computer readable means.

FIG. 4 schematically shows one example of a computer program product 60 comprising computer readable means 61. On this computer readable means 61, a computer program can be stored, which computer program, when run on the processor 23 of the UE 20 or the processor 12 of the centralized server 50, can cause the UE 20 and the centralized server 50 to execute the methods according to various embodiments described in the present disclosure for assisting the centralized initialization of radio access nodes 10. In this example, the computer program product is an optical disc, such as a Compact Disc, CD, a Digital Versatile Disc, DVD, or a blue-ray. The computer-readable means can also be solid state memory, such as flash memory or a software package (also sometimes referred to as software application, application or APP) distributed over a network, such as the Internet.

Figure 5:
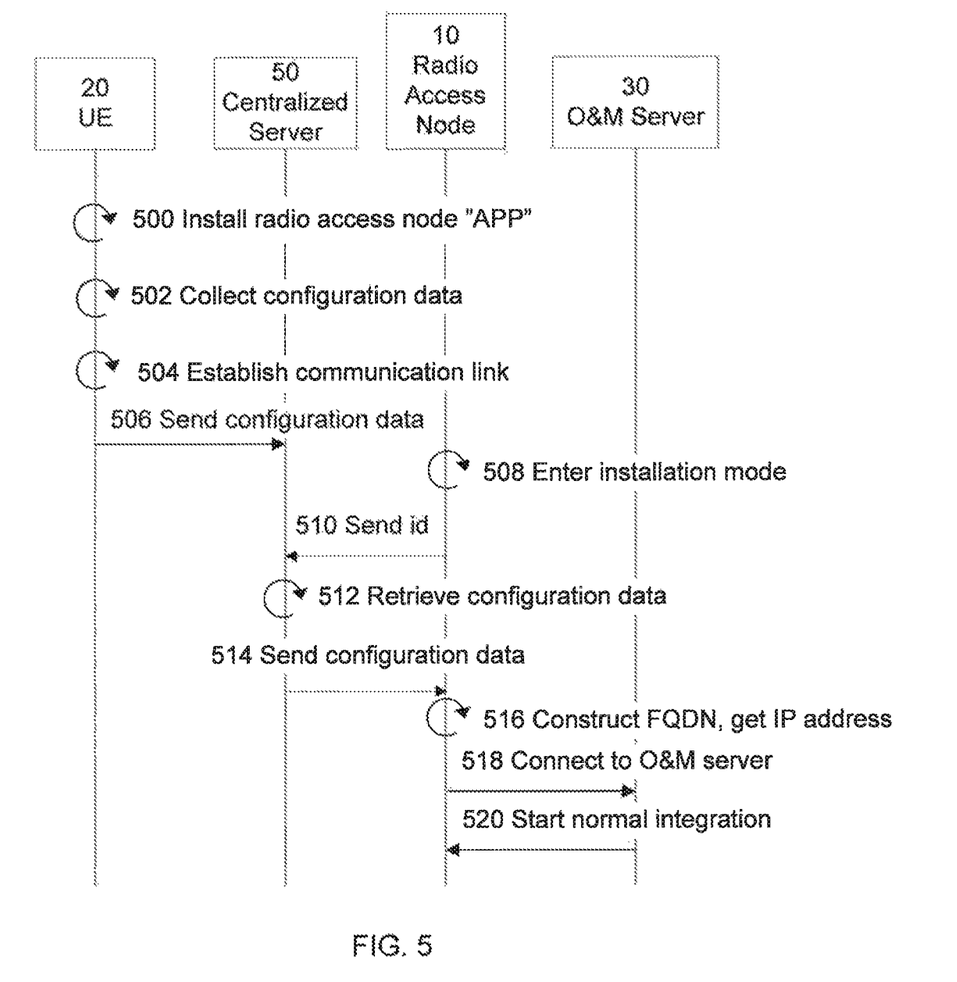
FIG. 5 schematically shows one example of a sequence diagram according to an embodiment of the present invention.

With reference to the sequence diagram of FIG. 5 an exemplary radio access node centralized initialization process will be described. The purpose of this process is to initialize a radio access node 10 that has not yet been configured.

In an initial step 500 a software package is installed in the UE 20, also sometimes referred to as software application, application or APP. The software package may be accessible for the UE 20 via a communications network 40, such as the Internet. Yet another option is that the UE 20 receives a software package such as an APP, where the APP comprises computer program having computer program means that, when executed in a processor of the UE 20, causes the UE 20 to start collecting 502 configuration data specific for the radio access node 10 that is to be initiated. Such configuration data may be an optical representation of data associated with the radio access node 10 such that said radio access node 10 may be uniquely identified. The configuration data may furthermore be the PLMN code, the broadcasted system information or geographical location data. Thus, depending on the software package installed in the UE 20 some or all of the configuration data mentioned above may be collected by the UE 20. In order to collect useful configuration data it is important that the UE 20 is at the same site as the radio access node 10 that is being initialized.

After all the configuration data, as specified by the software package, has been collected the UE 20 will establish 504 a communication link with the centralized server 50 and start sending 506 configuration data to the centralized server 50.

After the collection and sending of configuration data to the centralized server 50 it is time for the radio access node 10 to enter installation mode 508, which is done automatically by powering it up. According to embodiments of the present invention the radio access node is almost completely clean, i.e. it is not pre-configured with any data prior to the methods described herein start. The only exception is that the above mentioned address information is pre-installed such that the radio access node 10 during start up will get connected to the centralized server 50. When the connection has been established between centralized server 50 and the radio access node 10, the radio access node 10 will send 510 its unique identifier, such as the serial number, to the centralized server 50. The centralized server 50 uses the received unique identifier to retrieve 512 configuration data associated therewith and which previously has been received from the UE 20.

The retrieved configuration data is then sent 514 to the radio access node 10, which uses the configuration data such as the PLMN code to construct 516 the FQDN. In some embodiments the FQDN may also be constructed directly in the centralized server 50 and the sent to the radio access node 50. FQDN is a domain name that specifies the exact location in a tree hierarchy of a Domain Name System, DNS. FQDN specifies all domain levels including the top level domain and the root domain. A fully qualified domain name is unambiguous and can only be interpreted in one way. The FQDN is used to query the DNS for an IP address to a management server, such as the O & M server 30 described in conjunction with FIG. 1, a security gateway or other server of the network where the radio access node 10 is to be installed. Using the IP address received from the DNS, the radio access node 10 will connect 518 to the management system 30 and identify itself. The radio access node 10 will also provide the management system with configuration data that has been collected by the UE 20, and especially location information. Since the identity and the location of the radio access node 10 now is known to the management system normal integration 520 of the radio access node 10 can start.

Thus, the general concept for the methods for assisting centralized initialization of the radio access node 10, as performed in the UE 20, the centralized server 50 and the radio access node 10 has been described above. Now the methods performed by the UE 10 and the centralized server 50 will each be described separately in conjunction with FIGS. 6 and 7.

Figure 6:
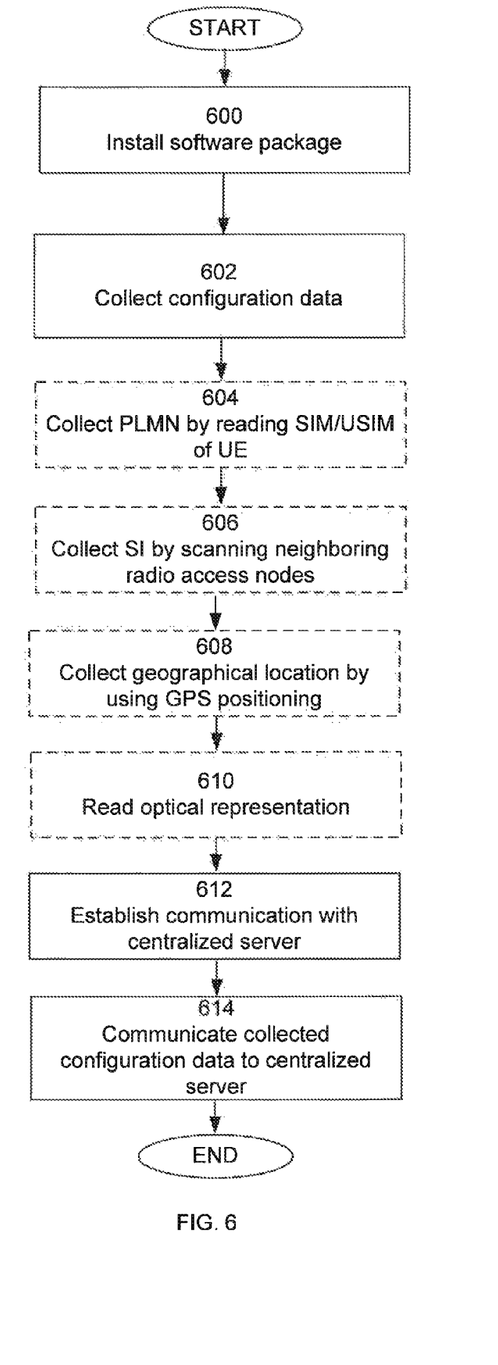
FIG. 6 is a flow chart illustrating a method performed by a user equipment according to an embodiment of the invention.

FIG. 6 is a flow chart illustrating a method performed by the UE user equipment according to an embodiment of the present invention. The first step 600 of the method is to install a software package in the UE 20. The software package may also be referred to as a software application, application or APP. The software package may be downloaded to the UE 20 via a communications network 40, such as the Internet or installed in any other suitable way in the UE 20, as is well known to a person skilled in the art. When the software package is executed in a processor 23 of the UE 20, the UE 20 starts assisting the radio access node 10 in its initialization process by among other things collect configuration data in step 620.

There are many types of configuration data that the UE 20 may collect. One such data type is the PLMN code. The PLMN is a network that is established and operated by an administration or by a recognized operating agency for the specific purpose of providing land mobile telecommunications services to the public. The PLMN code may comprise the Mobile Country Code, MCC and the Mobile Network Code, MNC. Each operator that provides mobile services has its own PLMN code, which uniquely identifies the operator. Thus, once the PLMN code has been provided to a radio access node 10, the Radio access node 10 will know the operator to which it belongs. There are many different ways the PLMN code may be collected by the UE 20. One alternative is that the PLMN code is loaded together with the installation of the software package. It is also possible that the UE 20 connects to the centralized server 50 and selects the appropriate PLMN code when the software package is executed in the processor 23 of the UE 20. Yet another alternative is to retrieve the PLMN code by reading the PLMN code from the Subscription Identity Module/Universal subscription Identity Module, SIM/USIM, of the user equipment 20. Thus, one collects the PLMN code already in use by the UE 20 itself. For example, if a certain mobile operator is to install radio access nodes 10, the personnel performing the installation process generally have a UE 20 with a subscription belonging to this particular mobile operator. That is, the SIM/USIM card or the like that is associated with the mobile operator in question. In other words, the UE 20 belonging to the personnel is already operating using the correct PLMN code. This way, the UE 20, or alternatively the software package, can retrieve the PLMN information directly from the UE 20.

Another type of configuration data that the UE 20 may collect is System Information, SI. System Information is collected in step 606 and may for example include information about the surrounding cellular network having the same PLMN code as the radio access node 10 that is going to be initialized. The UE 20 collects such SI by scanning the neighboring radio access nodes 10 belonging to the PLMN.

Additionally, the configuration data may comprise geographical location data. For example, the UE 20 may be equipped with a location collector, e.g. a GPS unit, for collecting 608 location data of the UE 20. Typically, the UE 20 and the radio access node 10 are located in close proximity to each other and, consequently, the location or position of the UE 20 is a coarse indication of the location or position of the radio access node 10. The location data may be used to simplify the connection of the radio access node 10 to a proper management system and to automatically associate the geographical position with the radio access node.

The configuration data may also comprise an optical representation of data associated the radio access node 10 to be initiated, the optical representation being a unique identifier of the radio access node 10. In some embodiments, the optical representation of data may be a barcode, which is for example attached to a surface, typically a wall surface, of the radio access node. To this end, the UE 20 may, as mentioned above, be equipped with a reader 21, e.g. a barcode reader, operable to read the optical representation of data from the radio access node 10.

Once all the configuration data has been collected by the UE 20, as specified in or by the installed software package that is executed in the processor 23 of the UE 20, the UE will establish 612 communication with the centralized server 50 and start communicating 614 the collected configuration data to the centralized server 50. Thus, after this step the UE 20 has done its part in assisting a centralized initialization of the radio access node 10.

Figure 7:
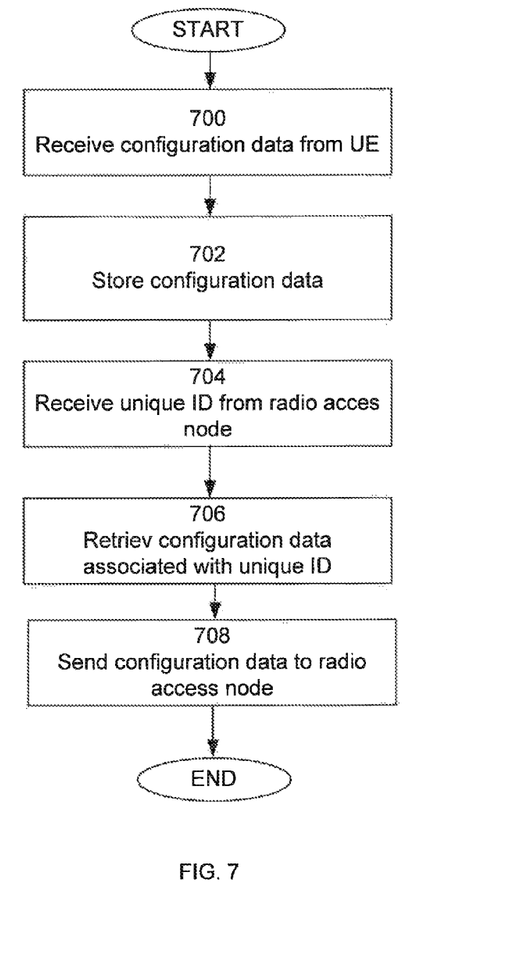
FIG. 7 is a flow chart illustrating a method performed by a centralized server according to an embodiment of the invention.

FIG. 7 is a flow chart illustrating a method performed by the centralized server 50 according to an embodiment of the invention. This method starts where the method performed by the UE 20 ends, i.e. by receiving configuration data from the UE 20. Thus, the centralized server 50 receives configuration data in a first step 500 together with the unique identifier of the radio access node 10 associated with said configuration data. The configuration data and the unique identifier are stored in the memory 13 of the centralized server 50. In a next step 704 the centralized server 50 will receive the unique identifier from the radio access node 10 that is being initialized and that just entered installation mode. The centralized server 50 uses the unique identifier to retrieve 706 the configuration data associated therewith from the memory 13. The retrieved configuration data is then sent 708 to the radio access node 10 having the unique identifier.

Thus, the methods for assisting centralized initialization of the radio access node 10, as performed in the UE 20 and the centralized server 50 have now been described in detail. As will be understood by a person skilled in the art, these methods will evidently reduce the administrative burden when initialization new radio access nodes 10. These methods do not, as in prior art, require personnel that is technically qualified. On the contrary by using the methods according to different embodiments of the present invention it would be possible to use for example a cab driver to initialize radio access nodes. Since no pre-configuration of the radio access nodes is necessary, other than the address information to the centralized server which is the same for all radio access nodes, it is easy for the cab driver to "grab" any radio access node from a specific vendor and bring it out to the site where it is to be initialized. Finding this site will probably the most difficult task in the whole process for the cab driver. On site the cab driver starts the software package or APP that previously has been installed on his UE. The APP will as described above collect configuration data and send it to the centralized server together with the unique identifier of the radio access node. The unique identifier may be collected by using the UE 20 to read a barcode provided on the radio access node as mentioned above. When the APP has finished the cab driver gets an alert and may now turn on or power up the radio access node. The radio access node will establish communication with the centralized server in order to receive its configuration data. Thus all the cab driver has to do in order to initialize the radio access node is to bring the radio access node to the right site, start an APP in his or her UE and thereafter push the power on button of the radio access node. All the necessary configuration data is automatically collected by the UE. In conclusion, various embodiments of the invention allow for a very simplified process for the personnel when initializing a new radio access node. As is understood the initialization may be performed by any non-skilled person and not only by the cab driver mentioned in the example above.

The inventors of the various embodiments of this invention have realized that the embodiments of the present invention may be especially interesting in future communication networks, such as in heterogeneous networks. Currently, mobile-broadband traffic is increasing. In parallel, new consumer trends are raising expectations for higher data rates in both the uplink and the downlink. Creating a heterogeneous network by introducing low power nodes is an attractive approach to meeting these traffic demands and performance expectations. This trend suggests that there will be a high number of low power nodes in the future. Due to the expected higher number of nodes that will need to be initialized, the deployment and related configurations of such nodes should preferably be as simple as possible. Since the various embodiments of the present invention allow for a simplified, yet secure, initialization of nodes, it is believed that the various embodiments of the invention will become an attractive solution for initializing new nodes in the future, e.g. nodes to be deployed in the future heterogeneous networks.

Although the present invention has been described above with reference to specific embodiments, it is not intended to be limited to the specific form set forth herein. Rather, the invention is limited only by the accompanying claims and, other embodiments than specified above are equally possible within the scope of the appended claims. In the claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A method for assisting a centralized initialization of a radio access node, the method being performed in a user equipment and comprises:
    collecting, by a processor of the user equipment, configuration data useable for the centralized initialization of the radio access node, wherein the step of collecting configuration data comprises:
        reading, by the processor of the user equipment, an optical representation of data associated with the radio access node, the optical representation of data being a unique identifier of the radio access node comprises reading a barcode wherein the barcode is the unique identifier of the radio access node; and
        collecting, by the processor of the user equipment, a Public Land Mobile Network, PLMN, code by reading the PLMN code from a Subscription Identity Module/Universal Subscription Identity Module, SIM/USIM, of the user equipment;
    establishing, by the processor of the user equipment, a communication link with a centralized server; and
    communicating, by the processor of the user equipment, the collected configuration data to the centralized server via the established communication link;
    storing, by the centralized server, said configuration data and its associated unique identifier;
    receiving, by the centralized server, the unique identifier from the radio access node;
    retrieving, by the centralized server, said configuration data associated with the unique identifier received from the radio access node; and
    sending, by the centralized server, said configuration data to the radio access node.

2. The method according to claim 1, wherein the step of collecting configuration data, by the processor of the user equipment, further comprises collecting broadcasted System Information, SI, data by scanning neighboring radio access nodes belonging to the PLMN code.

3. The method according to claim 1, wherein the step of collecting configuration data, by the processor of the user equipment, further comprises collecting geographical location data by using a Global Positioning System, GPS.

4. The method according to claim 1, wherein the user equipment is a smart phone, mobile phone, or cellular phone.

5. A method for assisting a centralized initialization of a radio access node, the method being performed in a centralized server when data useable for the centralized initialization has been collected by a user equipment, the method comprises:
   receiving, by the centralized server, a configuration data comprising a Public Land Mobile Network, PLMN, code from the user equipment together with a unique identifier of the radio access node associated with the received configuration data, wherein the user equipment reads an optical representation of data associated with the radio access node, the optical representation of data being a unique identifier of the radio access node comprises reading a barcode associated with the radio access node, wherein the barcode is the unique identifier of the radio access node and further wherein the user equipment collects the PLMN code by reading the PLMN code form a Subscription Identity Module/Universal Subscription Identity Module, SIM/USIM, of the user equipment;
   establishing, by the processor of the user equipment, a communication link with a centralized server;
   communicating, by the processor of the user equipment, the configuration data to the centralized server via the established communication link;
   storing, by the centralized server, said configuration data and its associated unique identifier;
   receiving, by the centralized server, the unique identifier from the radio access node;
   retrieving, by the centralized server, said configuration data associated with the unique identifier received from the radio access node; and
   sending, by the centralized server, said configuration data to the radio access node.

6. The method according to claim 5, wherein the configuration data further comprises location data of the user equipment.

7. The method according to claim 5, wherein the configuration data further comprises System Information, SI, data broadcasted by neighboring radio access nodes belonging to the PLMN code.

8. A non-transitory computer-readable medium having stored thereon a computer program for assisting a centralized initialization of a radio access node, the computer program comprising a computer program code which, when run by a processor of a user equipment, causes the user equipment to perform the following steps:
   collecting, by the processor of the user equipment, configuration data useable for the centralized initialization of the radio access node, wherein the step of collecting configuration data comprises:
      reading, by the processor of the user equipment, an optical representation of data associated with the radio access node, the optical representation of data being a unique identifier of the radio access node comprises reading a barcode wherein the barcode is the unique identifier of the radio access node; and
      collecting a Public Land Mobile Network, PLMN, code by reading the PLMN code from a Subscription Identity Module/Universal Subscription Identity Module, SIM/USIM, of the user equipment;
   establishing, by the processor of the user equipment, a communication link with a centralized server; and
   communicating, by the processor of the user equipment, the collected configuration data to the centralized server via the established communication link;
   storing, by the centralized server, said configuration data and its associated unique identifier;
   receiving, by the centralized server, the unique identifier from the radio access node;
   retrieving, by the centralized server, said configuration data associated with the unique identifier received from the radio access node; and
   sending, by the centralized server, said configuration data to the radio access node.

9. A user equipment for assisting a centralized initialization of a radio access node, comprising:
   a communication interface arranged for a wireless communication;
   a processor; and
   a memory for storing a software package comprising a computer program code which, when run by the processor, causes the user equipment to:
   read an optical representation of data associated with the radio access node, the optical representation of data being a unique identifier of the radio access node comprises reading a barcode associated with the radio access node, wherein the barcode is the unique identifier of the radio access node;
   collect, by the processor of the user equipment, configuration data useable for the centralized initialization of the radio access node, wherein collecting the configuration data comprises collecting a Public Land Mobile Network, PLMN, code by reading the PLMN code from a Subscription Identity Module/Universal Subscription Identity Module, SIM/USIM, of the user equipment;
   establish, by the processor of the user equipment, a communication link with a centralized server; and
   communicate, by the processor of the user equipment, the collected configuration data to the centralized server via the established communication link;
   storing, by the centralized server, said configuration data and its associated unique identifier;
   receiving, by the centralized server, the unique identifier from the radio access node;
   retrieving, by the centralized server, said configuration data associated with the unique identifier received from the radio access node; and
   sending, by the centralized server, said configuration data to the radio access node.

10. The user equipment according to claim 9, wherein the configuration data further comprises System Information, SI, data broadcasted by neighboring radio access nodes belonging to the PLMN code.

11. The user equipment according to claim 9, wherein the user equipment is a smart phone, mobile phone, or cellular phone.

12. A centralized server for assisting a centralized initialization of a radio access node when configuration data useable for the centralized initialization has been collected by a user equipment comprising:

a communication interface arranged for communication;
a processor; and
a memory for storing computer program comprising computer program code which, when run by the processor, causes the centralized server to:
receive configuration data comprising a Public Land Mobile Network, PLMN, code from the user equipment together with a unique identifier of the radio access node associated with the received configuration data, wherein the user equipment reads an optical representation of data associated with the radio access node, the optical representation of data being a unique identifier of the radio access node comprises reading a barcode associated with the radio access node, wherein the barcode is the unique identifier of the radio access node and further wherein the user equipment collects the PLMN code by reading the PLMN code form a Subscription Identity Module/Universal Subscription Identity Module, SIM/USIM, of the user equipment;

establishing, by the processor of the user equipment, a communication link with a centralized server;

communicating, by the processor of the user equipment, the configuration data to the centralized server via the established communication link;

store said configuration data in the memory together with its associated unique identifier;

receive the unique identifier from the radio access node;

retrieve the configuration data associated with the unique identifier, which has been received from the radio access node, from the memory; and send said configuration data to the radio access node.

13. The centralized server according to claim 12, wherein the received configuration data further comprises System Information, SI, data broadcasted by neighboring radio access nodes belonging to the PLMN code.

\* \* \* \* \*